US012180052B2

(12) United States Patent
Brochard

(10) Patent No.: US 12,180,052 B2
(45) Date of Patent: Dec. 31, 2024

(54) LOAD-HANDLING VEHICLE PROVIDED WITH A HEAT ENGINE AND METHOD FOR CONTROLLING THE ROTATIONAL SPEED OF THE HEAT ENGINE OF SUCH A VEHICLE

(71) Applicant: MANITOU BF, Ancenis (FR)

(72) Inventor: Francois Brochard, Nantes (FR)

(73) Assignee: MANITOU BF, Nantes (FR)

( * ) Notice: Subject to any disclaimer, the term of this patent is extended or adjusted under 35 U.S.C. 154(b) by 232 days.

(21) Appl. No.: 17/767,306

(22) PCT Filed: Sep. 10, 2020

(86) PCT No.: PCT/FR2020/051560

§ 371 (c)(1),
(2) Date: Apr. 7, 2022

(87) PCT Pub. No.: WO2021/069809

PCT Pub. Date: Apr. 15, 2021

(65) Prior Publication Data

US 2022/0388824 A1 Dec. 8, 2022

(30) Foreign Application Priority Data

Oct. 10, 2019 (FR) ...................................... 1911236

(51) Int. Cl.

*B66F 9/22* (2006.01)
*B66F 9/065* (2006.01)
(Continued)

(52) U.S. Cl.

CPC .............. *B66F 9/22* (2013.01); *B66F 9/0655* (2013.01); *B66F 9/0759* (2013.01); *B66F 17/003* (2013.01)

(58) Field of Classification Search

CPC ...... B66F 9/06; B66F 9/0655; B66F 9/07572; B66F 9/0759; B66F 9/205; B66F 9/22;
(Continued)

(56) References Cited

U.S. PATENT DOCUMENTS 4,675,827 A 6/1987 Narita et al.
9,505,395 B2 11/2016 Koide et al.
(Continued)

FOREIGN PATENT DOCUMENTS

CN 102365227 2/2012
JP 07081898 3/1995
(Continued)

OTHER PUBLICATIONS

International Search Report dated Dec. 8, 2020.
Japanese Office Action dated May 29, 2024.

*Primary Examiner* — Russell Frejd
*Assistant Examiner* — Brandon Z Willis
(74) *Attorney, Agent, or Firm* — IPSILON USA, LLP

(57) ABSTRACT

Load-handling vehicle (1) comprising: —a heat engine (2), —an accelerator pedal (3), —a pedal position sensor (4), a system (5) for driving the machine (1), which system is engaged with the heat engine (2), —a handling system (6) comprising at least one handling member (61), a pump (62) rotationally driven by the heat engine (2), at least one actuator (631, 632, 633) of the handling member (61), —a system (7) for controlling the actuators (631, 632, 633), and —a control unit. The control unit is configured to determine: —according to data provided by the control system (7), a pump flow rate setpoint (62), and —according to the pump flow rate setpoint (62) and the position data provided by the pedal position sensor (4), a rotation speed setpoint of the heat engine (2).

10 Claims, 4 Drawing Sheets

(51) Int. Cl.
*B66F 9/075* (2006.01)
*B66F 17/00* (2006.01)

(58) Field of Classification Search
CPC ........ B66F 9/20; B66F 17/003; F15B 15/202; F15B 15/02
See application file for complete search history.

(56) References Cited

U.S. PATENT DOCUMENTS

| | | | | |
|---|---|---|---|---|
| 2004/0149498 | A1* | 8/2004 | Nakashima | B66F 9/07572 180/6.24 |
| 2008/0128214 | A1* | 6/2008 | Tahashi | B66F 9/24 187/290 |
| 2009/0127928 | A1 | 5/2009 | Udagawa et al. | |
| 2010/0054956 | A1* | 3/2010 | Kitani | F02D 29/04 417/26 |
| 2013/0325268 | A1 | 12/2013 | Ishihara et al. | |
| 2016/0084275 | A1* | 3/2016 | Kaneko | B66F 9/07572 60/431 |
| 2016/0121900 | A1* | 5/2016 | Yoshizawa | E02F 9/202 701/50 |
| 2018/0231118 | A1* | 8/2018 | Kaneko | F16H 61/4017 |

FOREIGN PATENT DOCUMENTS

| | | |
|---|---|---|
| JP | 2005098215 | 4/2005 |
| JP | 2013-035658 | 2/2013 |
| JP | 2013166482 | 8/2013 |
| JP | 2019-142599 | 8/2019 |

* cited by examiner

LOAD-HANDLING VEHICLE PROVIDED WITH A HEAT ENGINE AND METHOD FOR CONTROLLING THE ROTATIONAL SPEED OF THE HEAT ENGINE OF SUCH A VEHICLE

RELATED APPLICATION

This application is a National Phase of PCT/FR2020/051560 filed on Sep. 10, 2020, which claims the benefit of priority from French Patent Application No. 19 11236, filed on Oct. 10, 2019, the entirety of which are incorporated by reference.

FIELD OF THE INVENTION

The present invention concerns a load-handling vehicle equipped with a heat engine and a method of controlling the rotation speed of the heat engine of this kind of load-handling vehicle.

It more particularly concerns a load-handling vehicle comprising:

- a heat engine,
- an accelerator pedal for controlling the rotation speed of the heat engine,
- a sensor of a parameter representing the position of the accelerator pedal termed a pedal position sensor,
- a system for driving movement of the machine coupled to said heat engine,
- a handling system comprising at least one handling member such as a lifting arm, a hydraulic pump driven in rotation by the heat engine, at least one hydraulic actuator of the handling member or members and, for the or each actuator, a fluidic circuit connecting the actuator to the hydraulic pump,
- a system for controlling the actuator or actuators, such as a control lever or a joystick, that can be actuated manually by the driver of the vehicle, and
- a control unit configured to acquire data supplied by the control system and data supplied by the pedal position sensor and to control each actuator as a function at least of the data supplied by the control system.

DESCRIPTION OF RELATED ART

This kind of load-handling vehicle is known as illustrated by the U.S. Pat. No. 9,505,395, for example. The driver of this kind of vehicle often requires the speed of execution of the movements of the handling system to be as rapid as possible. It is known in the prior art to increase the speed of execution of the movements of the handling system by action on the accelerator pedal. However, this solution has the undesirable effect of increasing the speed of forward movement of the chassis when the transmission is engaged. This action moreover leads to an increase in the fuel consumption and the impossibility of optimizing the rotation speed of the heat engine.

OBJECTS AND SUMMARY

One object of the invention is to propose a handling vehicle of the aforementioned type the design of which makes it possible to increase the speed of the handling movements without degrading the comfort of use of the vehicle.

To this end, the invention has for object a load-handling vehicle comprising:

- a heat engine,
- an accelerator pedal for controlling the rotation speed of the heat engine,
- a sensor of a parameter representing the position of the accelerator pedal termed a pedal position sensor,
- a system for driving movement of the machine coupled to said heat engine,
- a handling system comprising at least one handling member such as a lifting arm, a hydraulic pump driven in rotation by the heat engine, at least one hydraulic actuator of the handling member or members and, for the or each actuator, a fluidic circuit connecting the actuator to the hydraulic pump,
- a system that can be operated manually by the driver of the vehicle for controlling the actuator or actuators, and
- a control unit configured to acquire data supplied by the pedal position sensor and to control each as a function at least of data supplied by the control system, characterized in that the control unit is configured to determine:
- as a function at least of the data supplied by the control system, a hydraulic pump flow rate setpoint, and
- as a function of the hydraulic pump flow rate setpoint and position data supplied by the pedal position sensor a heat engine rotation speed setpoint, and to control the driving in rotation of the heat engine at said rotation speed setpoint so determined. The determination of the rotation speed setpoint of the heat engine as a function of the acquired position of the accelerator pedal and of the hydraulic pump flow rate setpoint resulting from the actuation of the control system makes it possible to take into account for the determination of the rotation speed of the heat engine both the actions carried out by the driver of the vehicle on the accelerator pedal and on the control system of the vehicle. This results in improved comfort of use of the vehicle without degrading the precision of the control of the handling movement. The permanent taking into account in parallel of the position of the accelerator pedal and the actuation of the control system to determine the rotation speed of the heat engine makes it possible to avoid the production of a control system that is too sensitive, which would degrade the control of the handling system.

In accordance with one embodiment of the invention, the control unit comprises a memory for storing heat engine rotation speed data associated with hydraulic pump flow rate data and accelerator pedal position data. Accordingly, to a pair of hydraulic pump flow rate/accelerator pedal position values there corresponds a heat engine rotation speed value. The hydraulic pump flow rate/accelerator pedal position/heat engine rotation speed values are organized in the form of a triplet. The control unit is configured to determine the rotation speed setpoint of the heat engine as being the stored rotation speed value of the heat engine associated with the stored flow rate and position data respectively corresponding, the one to the hydraulic pump flow rate setpoint value, the other to the acquired position of the accelerator pedal, that is to say the position data supplied by the pedal position sensor. The heat engine rotation speed setpoint is thus chosen in a manner perfectly matched to the actions of the driver of the vehicle.

In accordance with one embodiment of the invention, the control system comprises, for each actuator that can be controlled by said control system, at least one control member that can be operated manually mounted to be mobile between a neutral position and at least one end of travel position, and at least one associated position sensor, at least some of the data supplied by the control system to the control unit being formed by data supplied by the or each position sensor associated with a control member. The control member may advantageously be a control lever or a joystick, this joystick being able to carry one or more control members.

In accordance with one embodiment of the invention, the control unit comprises a memory for storing the maximum flow rate of the hydraulic pump and, for each actuator controlled in operation by the control system, the control unit is configured:

- to determine a flow rate value of said actuator required to execute the command,
- in the case of a plurality of controlled actuators, to add said required flow rate values of said actuators,
- to compare the required flow rate value of the one controlled actuator or the result of the addition of the required flow rate values of the plurality of controlled actuators with the maximum flow rate of the hydraulic pump, the hydraulic pump flow rate setpoint value corresponding to the smallest value of said comparison.

The sum of the required flow rate values for each control actuator during actuation of the control system by the driver of the vehicle makes it possible to determine with precision the hydraulic pump flow rate necessary for the correct functioning of the actuators, that is to say to the maximum speed, for the execution of the command, this determination being effected within the limit of the maximum flow rate authorized by the characteristics of the hydraulic pump. The sum of the required flow rate values for each control actuator during actuation of the control system makes it possible to process in optimum manner a movement command involving a plurality of actuators for the execution of said command.

In accordance with one embodiment of the invention, for each actuator controlled in operation by the control system the control unit is configured to determine the flow rate value of said actuator required to execute the command at least as a function of the data supplied by the at least one position sensor associated with the control member of said actuator.

In accordance with one embodiment of the invention, each fluidic circuit connecting an actuator to the hydraulic pump is provided with at least one blocking member mobile between an open position and a closed position of said associated circuit and the control unit comprises a memory for storing the maximum flow rate of each blocking member and is configured to determine the flow rate value of each actuator required to execute the command at least as a function of the data supplied by the at least one position sensor associated with the control member of said actuator and the stored maximum flow rate data of the blocking member of the circuit and to control the movement of the blocking member at least as a function of the required flow rate value so determined. The required flow rate value for an actuator is therefore a function both of the actuation of the control system to control said actuator, in particular to the movement travel of the control member of the actuator relative to the maximum authorized movement travel of said control member of the actuator and of the authorized maximum flow rate on the circuit connecting that actuator to the hydraulic pump. The control unit is moreover generally configured, for each actuator controlled by the control system, to control the movement of the member for blocking the circuit connecting said actuator to the hydraulic pump at least as a function of the required flow rate value so determined.

The invention also has for object a method of controlling the rotation speed of the heat engine of a load-handling vehicle comprising, in addition to the heat engine:

- an accelerator pedal for controlling the rotation speed of the heat engine,
- a sensor of a parameter representing the position of the accelerator pedal termed a pedal position sensor,
- a system for driving movement of the machine coupled to said heat engine,
- a handling system comprising at least one handling member such as a lifting arm, a hydraulic pump driven in rotation by the heat engine, at least one hydraulic actuator of the handling member or members and, for the or each actuator, a fluidic circuit connecting the actuator to the hydraulic pump,
- a system that can be operated manually by the driver of the vehicle for controlling the actuator or actuators, and
- a control unit configured to acquire data supplied by the control system and so-called position data supplied by the pedal position sensor and to control each actuator as a function at least of the data supplied by the control system, characterized in that said method comprises the steps of:
- determination by the control unit as a function at least of the data supplied by the control system of a hydraulic pump flow rate setpoint,
- determination by the control unit as a function of the hydraulic pump flow rate setpoint and position data supplied by the pedal position sensor of a heat engine rotation speed setpoint, and
- control by the control unit of the driving in rotation of the heat engine at said rotation speed setpoint so determined.

The rotation speed of the heat engine is therefore a function both of the action of the driver of the vehicle on the control system and on the accelerator pedal, these actions being considered in a cumulative manner and not in a selective manner.

In accordance with one embodiment of the present invention, the control unit comprising a memory for storing heat engine rotation speed data associated with hydraulic pump flow rate data and accelerator pedal position data, said method comprises a step of determination by the control unit of the heat engine rotation speed setpoint as being the stored speed value associated with the stored flow rate data and position data respectively corresponding, the one to the hydraulic pump flow rate setpoint value, the other to the position data supplied by the pedal position sensor. Accordingly, to a pair of hydraulic pump flow rate/accelerator pedal position values there corresponds a rotation speed value of the heat engine.

In accordance with one embodiment of the method according to the invention, the control unit comprising a memory for storing the maximum flow rate of the hydraulic pump, said method comprises:

- a step of determination by the control unit, for each actuator controlled in operation by the control system, of a flow rate value of said actuator required to execute the command,
- when a plurality of actuators are controlled, a step of addition of said required flow rate values of said actuators,
- a step of comparison of the required flow rate value of the one controlled actuator or of the result of the addition of the required flow rate values of the plurality of controlled actuators with the maximum flow rate of the hydraulic pump, the hydraulic pump flow rate setpoint value corresponding to the smallest value of said comparison.

The pump hydraulic flow rate setpoint value is chosen taking into account the required flow rate value for each actuator controlled by the control system within the limit of the maximum flow rate value of the hydraulic pump.

In accordance with one embodiment of the method according to the invention, the control system comprising for each actuator that can be controlled by said control system at least one control member that can be actuated manually mounted to be mobile between a neutral position and at least one end of travel position and at least one associated position sensor, said method comprises a step of determination by the control unit of the flow rate value of the or each actuator required to execute the command at least as a function of the data supplied by the at least one position sensor associated with the control member of said actuator.

In accordance with one embodiment of the method according to the invention, each fluidic circuit connecting an actuator to the hydraulic pump being provided with at least one blocking member mounted to be mobile between an open position and a closed position of said associated circuit and the control unit comprising a memory for storing the maximum flow rate of each blocking member, said method comprises:

- a step of determination by the control unit of the flow rate value of each actuator required to execute the command at least as a function of the data supplied by said at least one position sensor associated with the control member of said actuator and the stored maximum flow rate data of the blocking member, and
- a step of controlling the movement of the blocking member at least as a function of the required flow rate value so determined.

The required flow rate value for an actuator is therefore a function both of the actuation of the control system to control said actuator, in particular the movement travel of the control member of the actuator relative to the maximum authorized movement travel of said control member of the actuator and of the authorized maximum flow rate in the circuit connecting that actuator to the hydraulic pump.

BRIEF DESCRIPTION OF THE DRAWINGS

The invention will be clearly understood on reading the following description of examples with reference to the appended drawings in which.

DETAILED DESCRIPTION

The concept of the invention is described more completely hereinafter with reference to the appended drawings, in which embodiments of the concept of the invention are shown. Any reference throughout the specification to “an embodiment” means that a particular functionality, structure or feature described in relation to one embodiment is included in at least one embodiment of the present invention. Accordingly, the appearance of the expression “in one embodiment” at various places throughout the description does not necessarily refer to the same embodiment. Moreover, particular functions, structures or features can be combined in any appropriate manner in one or more embodiments.

Figure 1:
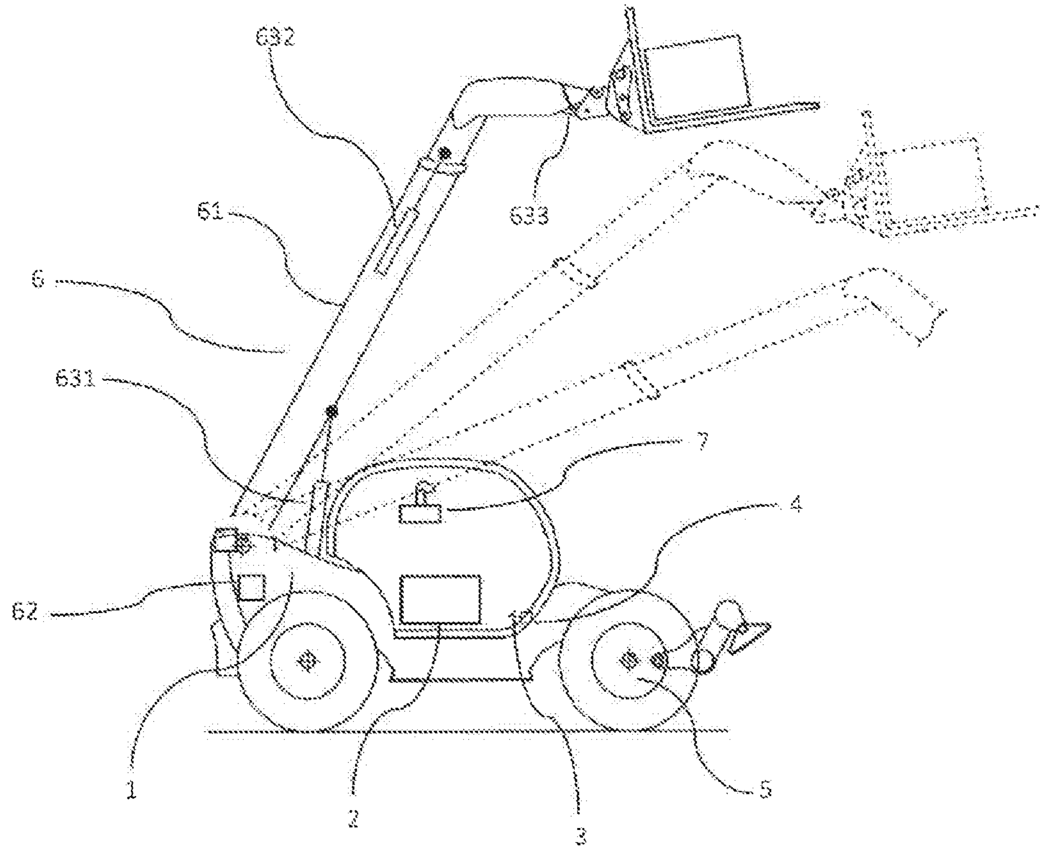
FIG. 1 represents a schematic side view of a load-handling vehicle according to the invention.
Figure 2:
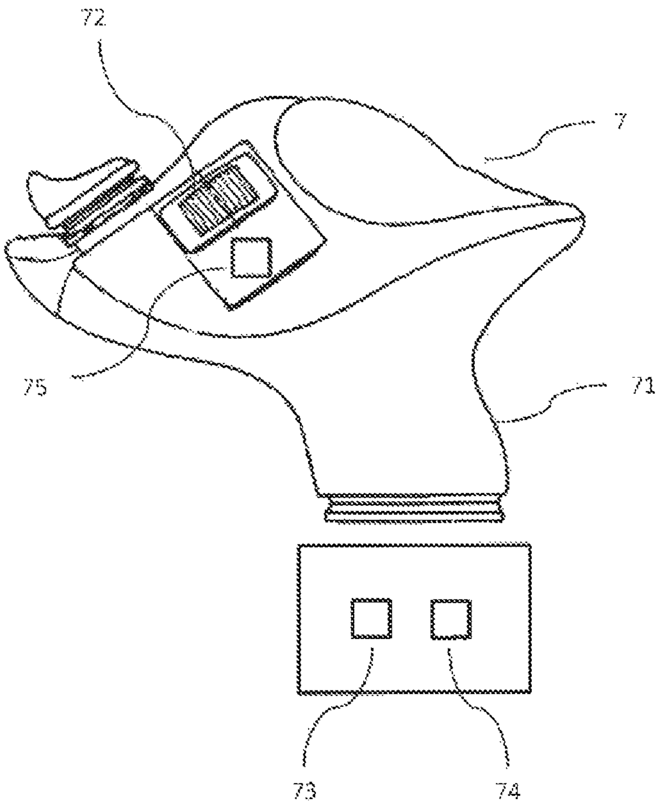
FIG. 2 represents a schematic detail view of the control system that can be actuated by the driver of the vehicle.
Figure 3:
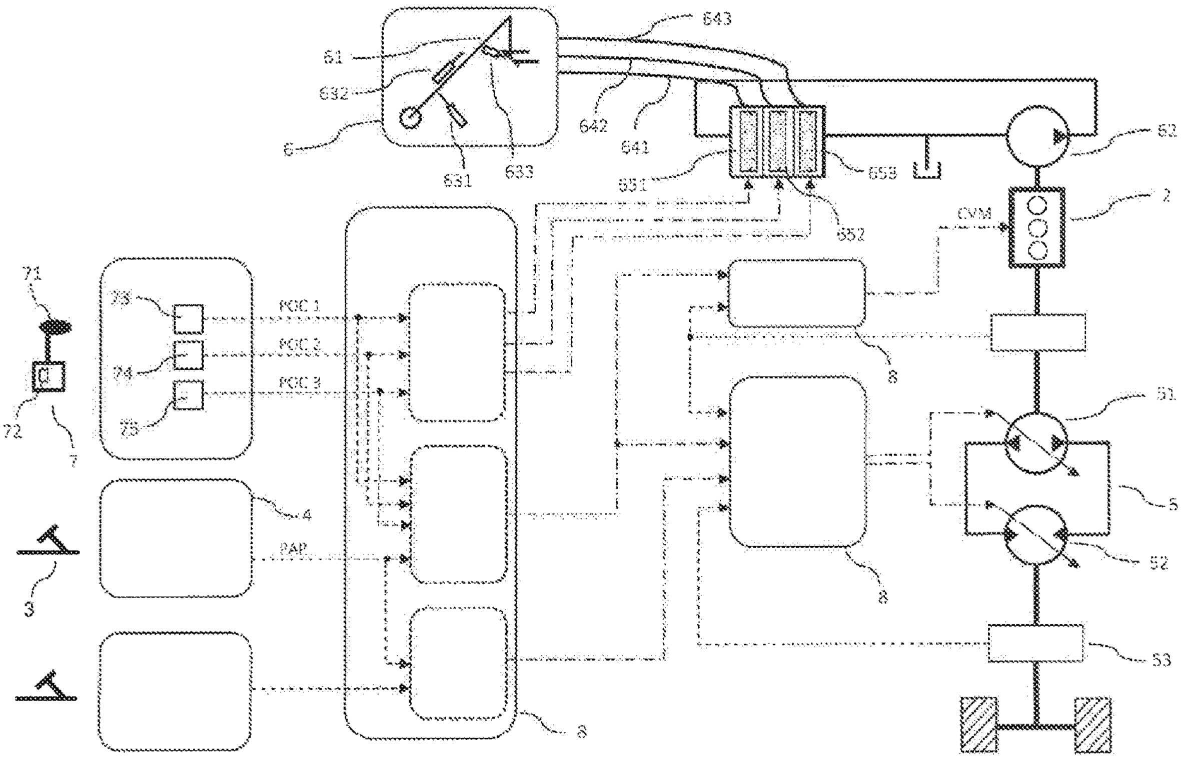
FIG. 3 is a schematic partial functional representation of the control unit in its environment.

As mentioned hereinabove, the invention concerns a load-handling vehicle 1 that may conform to that represented in FIG. 1. That vehicle 1 comprises a chassis. In the example represented, that chassis is equipped with wheels resting on the ground to form a rolling chassis. That chassis is surmounted by a driver station. The driver station takes the form of a driver’s cab inside which is disposed at least one seat on which the driver of the vehicle can take their place. The vehicle 1 further comprises a heat engine 2 and a system 5 for driving the vehicle, in particular the rolling chassis, in movement by driving the wheels of the vehicle 1 in movement in rotation. This system 5 for driving movement of the vehicle is coupled to the heat engine 2. In particular this system 5 for driving the vehicle in movement comprises a hydrostatic pump 51 driven in operation by the heat engine 2. This hydrostatic pump 51 is coupled to at least one hydrostatic motor 52 for driving the wheels of the vehicle in rotation. A speed sensor 53 may be disposed between the hydrostatic motor 52 and the wheels to make available access to the real speed of movement of the vehicle. Likewise, a speed sensor can sense the actual rotation speed of the heat engine 2. This information may be supplied to a control unit 8 that will be described hereinafter. The system 5 for driving the vehicle in movement is controlled in particular with the aid of an accelerator pedal 3 disposed in the driver’s cab. This accelerator pedal 3 is equipped with a sensor of a parameter representing the position of the accelerator pedal. This sensor will be referred to hereinafter as the pedal position sensor 4. This kind of pedal position sensor 4 is well known to those skilled in this art. As mentioned hereinabove, the vehicle comprises a control unit 8 to which the data from the pedal position sensor 4 is supplied. This control unit 8 is therefore configured to acquire position data supplied by the pedal position sensor 4, this position data being represented by PAP in the figures. The control unit 8 emits control signals for the heat engine 2, and in particular for the rotation speed of the heat engine 2, as a function at least of this position data PAP.

The vehicle 1 further comprises a handling system 6 comprising at least, for load handling, at least one handling member 61, a hydraulic pump 62 driven in rotation by the heat engine 2, at least one hydraulic actuator of the handling member or members and, for each actuator, a fluidic circuit connecting the actuator to the hydraulic pump 62. In the examples represented the handling member 61 is a lifting arm carried by the chassis of the vehicle 1. In an equivalent manner, the handling member could have been formed by a boom or other member. Likewise, the term “load” must be understood in its widest sense and in particular includes persons.

This arm is a pivoting arm mounted to pivot about a so-called horizontal axis orthogonal to the longitudinal axis of the arm and parallel to the plane of the vehicle 1 resting on the ground, in the position with the vehicle on a horizontal surface, for the passage of the arm from a low position to a high position and vice versa, with the aid of an actuator, such as a cylinder, shown at 631 in the figures and disposed between the arm and the rolling chassis. In the example represented, a single double-acting cylinder is represented, supplied with fluid by the hydraulic pump 62. A pair of parallel single-acting cylinders supplied turn and turn about with fluid could have been used in an equivalent manner.

This arm is a telescopic arm formed in the example represented of two nested and sliding arm sections driven in relative movement by an actuator for the passage of the arm from a retracted position to a deployed position and vice versa. This actuator is represented at 633 in the figures.

This telescopic deployment actuator 633 is formed by a hydraulic cylinder the body of which is mounted on and secured to one arm section and the piston rod to the other arm section.

The arm is equipped at its free end with an accessory such as a bucket-carrier or a fork-carrier. This accessory is mounted via an actuator, represented at 632 in the figures, mobile in pivoting about a so-called horizontal axis, orthogonal to the longitudinal axis of the arm between an excavation position and a tipping position. The tipping position corresponds to the extreme position of pivoting toward the ground of the accessory whereas the excavation position corresponds to a position of upward pivoting of the accessory. This actuator 632 is disposed between the accessory and the arm and may again consist of a double-acting hydraulic cylinder or a pair of single-acting cylinders. The accessory is driven in movement in pivoting about an axis parallel to the pivot axis of the arm.

Obviously, without departing from the scope of the invention the number and the design of the actuators 631,632,633 described hereinabove can vary. The same goes for the design of the handling member 61. For supplying it with fluid, each actuator 631, 632, 633 is connected to the hydraulic pump 62 by a connecting fluidic circuit. Each connecting fluidic circuit is in the examples represented equipped with a distributor and a blocking member, such as a valve. This blocking member is mounted to be mobile between an open position and a closed position of the associated fluidic circuit. Thus the actuator 631 for driving the handling member 61 in pivoting movement is connected to the hydraulic pump 62 by the connecting fluidic circuit 641 equipped with the blocking member 651, the actuator 632 for driving movement in pivoting of the accessory is connected to the hydraulic pump 62 by the connecting fluidic circuit 642 equipped with the blocking member 652 and the actuator 633 controlling the telescoping of the handling member 61 is connected to the hydraulic pump 62 by the connecting fluidic circuit 643 equipped with the blocking member 653.

The control unit 8 comprises a memory 11 for storing the maximum flow rate of each blocking member 651, 652, 653, this maximum flow rate corresponding to the extreme open position of the blocking member. Accordingly, the maximum flow rate represented by DOM1 in the figures corresponds to the maximum flow rate of the blocking member 651, the maximum flow rate represented by DOM2 in the figures corresponds to the maximum flow rate of the blocking member 652 and the maximum flow rate represented by DOM3 in the figures corresponds to the maximum flow rate of the blocking member 653.

The control unit 8 of the vehicle is configured to control the operation of the actuators 631,632 and 633, which enables control of the movement of the handling member 61, that is to say of the arm and of the accessory.

This control unit 8 is an electronic unit and/or a computer that comprises for example a microcontroller or a microprocessor associated with a memory. This memory contains computer instructions that, when they are executed by the microcontroller or the microprocessor associated with the memory, enable the microcontroller or the microprocessor to execute the operations or steps described hereinafter. Accordingly, when it is specified that the unit or the means of said unit are configured to carry out a given operation, that means that the unit contains computer instructions and the corresponding execution means that enable said operation to be carried out and/or corresponding electronic components.

In other words, the functions and steps described may be implemented in the form of a computer program or via hardware components (for example programmable gate arrays). In particular, the functions and steps carried out by the system 5 for driving the machine may be carried out by sets of instructions or computer modules implemented in a processor or controller or carried out by dedicated electronic components or components of FPGA or ASIC type. It is also possible to combine a computer and electronics.

The control unit 8 therefore controls the handling system 6 and in particular the movements of the arm and of the accessory of the handling member 61 by controlling the corresponding actuators via the hydraulic circuits as described hereinabove.

The control signals supplied by the control unit 8 act on the members, such as a distributor or a blocking member (valve), disposed on the connection between the hydraulic pump 62 and the actuators to enable an appropriate supply of fluid to the actuators in a manner known in itself.

The handling vehicle 1 further comprises a system 7 for controlling the load-handling system 6 and in particular the actuators 631, 632, 633 of the load-handling system 6. This control system 7 is actuated manually and enables data to be supplied to the control unit 8.

This data represented by POC1, POC2, POC3 in the figures is processed by the control unit 8. On the basis of this data, the control unit 8 generates signals to control at least the load-handling system 6 as described hereinabove.

The control system 7 that furnishes the data POC1, POC2, POC3 to the control unit 8 for controlling the handling system 6, in particular the actuators 631, 632, 633 of the handling system 6, may take many forms.

For each actuator 631, 632, 633 that can be operated by said control system 7, the control system 7 comprises at least one control member that can be actuated manually mounted to be mobile between a neutral position and at least one end of travel position and at least one associated position sensor. At least some of the data POC1, POC2, POC3 supplied by the control system 7 to the control unit 8 is position data formed by data supplied by the or each position sensor associated with a control member.

In the examples represented, one of the control members represented at 71 is a control lever also known as a joystick. This control member 71 enables actuation of the actuator 631 for driving pivoting movement of the arm of the handling member 61 and/or the actuator 632 for driving pivoting movement of the accessory of the handling member 61 as a function of the type of movement of the control member 71.

This control member 71 is equipped at its base with two position sensors 73, 74, also known as coders, to enable the transmission of position data POC1 and POC2 from the control member 71 to the control unit 8. One example of this kind of control member is for example described in the patent FR 2 858 861. This control member 71 can therefore be moved forward, rearward, leftward or rightward relative to the vehicle. The forward and rearward relative to the vehicle movements of this control member 71 sensed by the position sensor 73 generally control the up and down movement of the arm of the handling member 61, while the leftward and rightward relative to the vehicle movements of the control member 71 sensed by the position sensor 74 control the pivoting movement of the accessory.

These forward/rearward and leftward/rightward directions correspond to the main directions and the control member 71 may be driven in accordance with an infinity of directions, the movement of the control member 71 in any direction corresponding to a combined action, proportional to the position of the control member 71 relative to the main directions. In the state when not operated this control member 71 is urged by a spring into a neutral position, that is to say into an intermediate position between right/left and front/rear.

The position information sent to the system for controlling the actuators is therefore generally information relating to the angular position of the control member 71 relative to the position that it occupies in the neutral position.

In this neutral position, when the control member 71 is moved angularly from the neutral position toward the right inside a predetermined angular sector, it commands the pivoting movement of the accessory in the tipping direction. When the control member 71 is moved angularly from the neutral position toward the left inside a predetermined angular sector, it commands the pivoting movement of the accessory in the excavation direction. In the same manner, when the control member 71 is moved angularly from the neutral position toward the front inside a predetermined angular sector, it commands the raising of the arm, whereas when the control member 71 is moved angularly from the neutral position toward the rear inside a predetermined angular sector, it commands the lowering of the arm. Obviously, without departing from the scope of the invention the right/left, forward/rearward positions can be interchanged.

These angular sectors may overlap to enable, by actuation of the control members 71, pivoting of the accessory in parallel with up and down movement of the arm.

The control system 7 comprises a second control member represented at 72 in the figures. The second control member 72 is associated with a position sensor represented at 75 in the figures to enable the transmission of the position data POC3 to the control unit 8. This control member 72 enables actuation of the actuator 633 for the telescopic deployment of the arm part of the handling member 61.

Here the control member 72 is formed by a thumbwheel positioned on the control member 71. Actuation of this thumbwheel enables the arm of the handling member 61 to be driven in movement between a retracted position and a deployed position. In fact, rotation of the thumbwheel in one direction from a neutral position of said thumbwheel enables the deployment of the arm by sliding movement of the second arm section in the direction extending the arm and rotation of the thumbwheel in an opposite direction from the neutral position enables retraction of the arm. This control member 72 is urged by a spring into a neutral position.

The number of control members described hereinabove is equal to two. However, there may be any number of control members without departing from the scope of the invention, and in particular more than two or less than two. Likewise, one or more position sensors may be associated with the same control member without departing from the scope of the invention.

The control unit 8 is configured to acquire the data POC1, POC2, POC3 from the control system 7 corresponding at least to the position data from the position sensors of the control members 71, 72 of the control system 7. The control unit 8 is configured to determine as a function at least of the data POC1, POC2, POC3 supplied by the control system 7 a hydraulic pump flow rate setpoint CDP.

To this end, the control unit 8 comprises a memory 10 for storing the maximum flow rate DMP of the hydraulic pump 62. This maximum flow rate DMP is a known predetermined value that is a function in particular of the cubic capacity and the power of the hydraulic pump 62.

For each actuator 631 or 632 or 633 controlled in operation by the control system 7 to execute a command, the control unit 8 is configured to determine a flow rate value of said actuator required to execute said command at least as a function of the data supplied by the at least one position sensor 73 or 74 or 75 associated with the control member 71 or 72 of said actuator 631, 632, 633.

Accordingly, when the control member 71 is actuated so that the position sensor 73 of the control member 71 detects movement of the control member 71 relative to the neutral position, the position data POC1 is sent to the control unit 8. In a similar manner, when the control member 71 is actuated so that the position sensor 74 of the control member 71 detects movement of the control member 71 relative to the neutral position, the position data POC2 is sent to the control unit 8. Finally, when the control member 72 is actuated so that the sensor 75 of the control member 72 detects movement of the control member 72 relative to the neutral position, the position data POC3 is sent to the control unit 8. This position data POC1, POC2, POC3 may be addressed selectively or simultaneously to the control unit 8 according to the type of actuation of the control system 7 that is performed.

The position data POC1 from the position sensor 73 associated with the maximum flow rate data DOM1 of the blocking member 651 of the connecting circuit of the actuator 631 controlled in operation by the control member 71 associated with the position sensor 73 enables determination of the required flow rate value VDS1 of said actuator 631. Accordingly, if the maximum movement travel of the control member 71 between its neutral position and one of its extreme positions is 100 mm and if the position sensor 73 detects a movement of 50 mm i.e. 50% of the total travel, the required flow rate value VDS1 of the actuator 631 is equal to the real travel/total travel×DOM1. Accordingly, in the example, if the maximum flow rate data DOM1 of the blocking member 651 is equal to 0.003 $m^3/s$, the required flow rate value VDS1 of the actuator 631 is equal to 0.0015 $m^3/s$, that is to say 0.5×0.003.

In the same manner, the position data POC2 from the position sensor 74 associated with the maximum flow rate data DOM2 of the blocking member 652 of the connecting circuit of the actuator 632 controlled in operation by the control member 71 associated with the position sensor 74 enables determination of the required flow rate value VDS2 of said actuator 632.

The position data POC3 from the position sensor 75 associated with the maximum flow rate data DOM3 of the blocking member 653 of the connecting circuit of the actuator 633 controlled in operation by the control member 72 associated with the position sensor 75 enables determination of the required flow rate value VDS3 of said actuator 633.

Each time the calculation is similar to that adopted for VDS1.

When the position sensor associated with the control member detects a neutral position of the control member, the required flow rate value of the associated actuator is zero. In the situation where a single actuator is controlled in operation for the execution of the command from the control system 7 by the driver of the vehicle, the required flow rate value of said actuator determined by the control unit 8 is compared with the stored maximum flow rate value DMP of the hydraulic pump 62. If this required flow rate value of the actuator is less than the maximum flow rate value DMP of the hydraulic pump 62 then the hydraulic pump flow rate setpoint value CDP is chosen equal to the required flow rate value of the actuator.

Conversely, if the required flow rate value of the actuator is greater than the maximum flow rate value DMP of the hydraulic pump 62 then the flow rate setpoint value CDP of the hydraulic pump is chosen equal to the maximum value DMP of the pump 62.

The flow rate setpoint value CDP of the hydraulic pump 62 is therefore chosen each time to correspond to the smallest value (MIN) of the comparison.

In the situation where a plurality of actuators are operated simultaneously by the driver of the vehicle to execute a command from the control system 7, the required flow rate values of the operated actuators are added before being compared with the maximum flow rate DMP of the hydraulic pump 62. The flow rate setpoint value CDP of the hydraulic pump 62 is in a similar way to what has been described hereinabove chosen as corresponding to the smallest value of the comparison.

Accordingly, for example, if the actuators 631 and 632 are controlled in operation by actuation of the handling member 61 and detection by the position sensors 73 and 74 then the values VDS1 and VDS2 are added and the result of the summation is compared with the maximum flow rate value DMP of the hydraulic pump 62.

Figure 4:
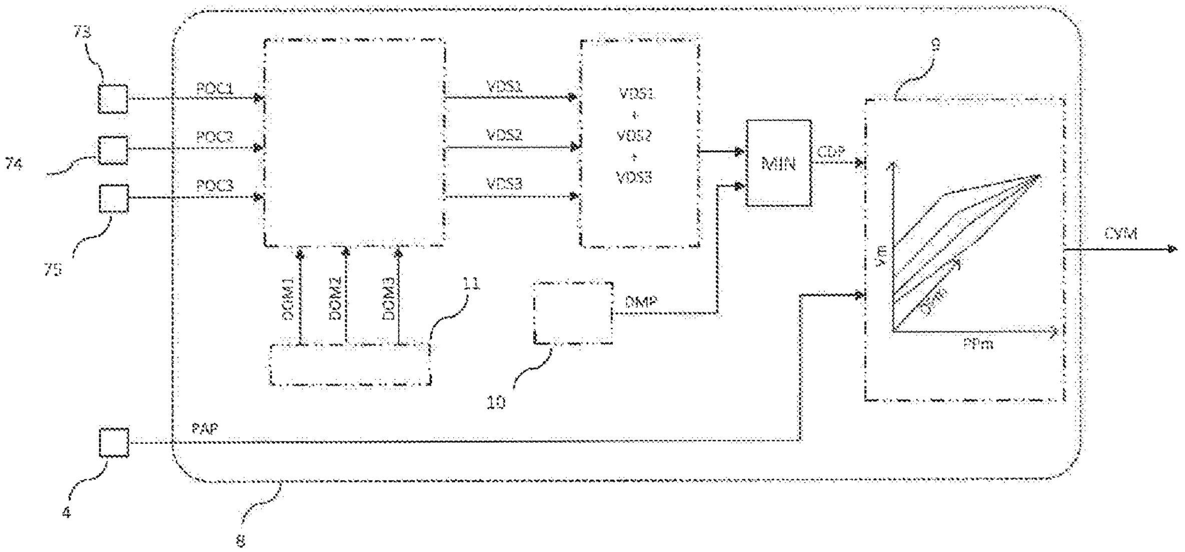
FIG. 4 is a schematic functional representation of a portion of the control unit.

The control unit 8 further comprises a memory 9 for storing rotation speed Vm data of the heat engine 2 associated with flow rate DPm data of the hydraulic pump 62 and position PPm data of the accelerator pedal 3. Accordingly, to a pair of values of the pump flow rate value DPm and accelerator pedal 3 position value PPm there corresponds a value Vm of the rotation speed of the pump as illustrated in FIG. 4.

If the stored flow rate value DMP retained as that of the flow rate setpoint CDP of the hydraulic pump 2 as determined hereinabove is chosen, and if the position value PPm of the accelerator pedal corresponds to the position data PAP supplied by the pedal position sensor 4, there is obtained for this pair a stored speed Vm value chosen as being that retained as the rotation speed setpoint value CVM of the heat engine 2.

The control unit 8 being configured to determine the rotation speed setpoint CVM of the heat engine 2 as being the stored speed value Vm associated with the stored flow rate data DPm and position data PPm corresponding respectively, the one to the value of the flow rate setpoint value CDP of the hydraulic pump 62, the other to the position data PAP supplied by the pedal position sensor 4.

Generally speaking, the control unit 8 is therefore configured to determine the rotation speed setpoint CVM of the heat engine as a function of the flow rate setpoint CDP of the hydraulic pump 62 and the position data PAP supplied by the pedal position sensor 4 and to control the driving in rotation of the heat engine 2 at said rotation speed setpoint CVM so determined.

This rotation speed of the heat engine 2 that is chosen as a function of the actions of the driver of the machine on the accelerator pedal and on the control system 7 of the actuators of the handling system enables driving comfort associated with precise control of the actuation of the handling system, and does this continuously.

The invention claimed is:

1. A load-handling vehicle comprising:

a heat engine, an accelerator pedal for controlling the rotation speed of the heat engine, a pedal position sensor of a parameter representing the position of the accelerator, a system for driving the machine in movement coupled to said heat engine, a handling system having at least one handling member such as a lifting arm, a hydraulic pump driven in rotation by the heat engine, at least one hydraulic actuator of the handling member or members and, for the or each actuator, a fluidic circuit connecting the actuator to the hydraulic pump, a system that can be actuated manually by the driver of the vehicle for operating the actuator or actuators, and a control unit configured to acquire data supplied by the pedal position sensor and to control each actuator as a function at least of data supplied by the control system, wherein the control unit comprises a memory for storing heat engine rotation speed data associated with hydraulic pump flow rate and accelerator pedal position data, in that the control unit is configured to determine:

as a function at least of the data supplied by the control system, a hydraulic pump flow rate setpoint, and as a function of the hydraulic pump flow rate setpoint and accelerator pedal position data supplied by the pedal position sensor, a heat engine rotation speed setpoint, and to control the driving in rotation of the heat engine at said rotation speed setpoint so determined, the control unit being configured to determine the rotation speed setpoint of the heat engine as being the stored speed value associated with the stored flow rate data and accelerator pedal position data corresponding respectively, the one to the value of the flow rate setpoint value of the hydraulic pump, the other to the accelerator pedal position data supplied by the pedal position sensor.

2. The load-handling vehicle as claimed in claim 1, wherein the control system comprises, for each actuator that can be controlled by said control system, at least one control member that can be operated manually mounted to be mobile between a neutral position and at least one end of travel position, and at least one associated position sensor, at least some of the data supplied by the control system to the control unit being formed by data supplied by the or each position sensor associated with a control member.

3. The loading-handling vehicle as claimed in claim 1, the control unit comprises a memory for storing the maximum flow rate of the hydraulic pump and in that for each actuator controlled in operation by the control system the control unit is configured:

to determine a flow rate value of said actuator required to execute the command, in the case of a plurality of controlled actuators, to add said required flow rate values of said actuators, to compare the required flow rate value of the one controlled actuator or the result of the addition of the required flow rate values of the plurality of controlled actuators with the maximum flow rate of the hydraulic pump, the hydraulic pump flow rate setpoint value corresponding to the smallest value of said comparison.

4. The load-handling vehicle as claimed in claim 3, wherein the control system comprises, for each actuator that can be controlled by said control system, at least one control member that can be operated manually mounted to be mobile between a neutral position and at least one end of travel position, and at least one associated position sensor, at least some of the data supplied by the control system to the control unit being formed by data supplied by the or each position sensor associated with a control member, and wherein for each actuator controlled in operation by the control system the control unit is configured to determine the flow rate value of said actuator required to execute the command at least as a function of the data supplied by the at least one position sensor associated with the control member of said actuator.

5. The load-handling vehicle as claimed in claim 4, each fluidic circuit connecting an actuator to the hydraulic pump is provided with at least one blocking member mobile between an open position and a closed position of said associated circuit and in that the control unit comprises a memory for storing the maximum flow rate of each blocking member and is configured to determine the flow rate value of each actuator required to execute the command at least as a function of the data supplied by the at least one position sensor associated with the control member of said actuator and the stored maximum flow rate data of the blocking member of the circuit and to control the movement of the blocking member at least as a function of the required flow rate value so determined.

6. A method of controlling the rotation speed of a heat engine of a load-handling vehicle having, in addition to the heat engine:

an accelerator pedal for controlling the rotation speed of the heat engine, a pedal position sensor of a parameter representing the position of the accelerator pedal, a system for driving movement of the vehicle coupled to said heat engine, a handling system comprising at least one handling member such as a lifting arm, a hydraulic pump driven in rotation by the heat engine, at least one hydraulic actuator of the handling member or members and, for the or each actuator, a fluidic circuit connecting the actuator to the hydraulic pump, a system that can be actuated manually by the driver of the vehicle for controlling the actuator or actuators, and a control unit configured to acquire data supplied by the control system and accelerator pedal position data supplied by the pedal position sensor and to control each actuator as a function at least of the data supplied by the control system, wherein the control unit has a memory for storing heat engine rotation speed data associated with hydraulic pump flow rate and accelerator pedal position data, wherein said method comprises the steps of:

determination by the control unit as a function at least of the data supplied by the control system, a hydraulic pump flow rate setpoint, and determination by the control unit as a function of the hydraulic pump flow rate setpoint and accelerator pedal position data supplied by the pedal position sensor, a rotation speed setpoint of the heat engine, and control by the control unit of the driving in rotation of the heat engine at said rotation speed setpoint so determined, wherein the control unit is configured to determine the rotation speed setpoint of the heat engine as being the stored speed value associated with the stored flow rate data and position data corresponding respectively, the one to the value of the flow rate setpoint value of the hydraulic pump, the other to the position data supplied by the pedal position sensor.

7. The method as claimed in claim 6 of controlling the rotation speed of the heat engine of a load-handling vehicle, wherein the control unit comprising a memory for storing rotation speed data of the heat engine associated with hydraulic pump flow rate data and accelerator pedal position data, said method comprises a step of determination by the control unit of the heat engine rotation speed setpoint based on the determined hydraulic pump flow rate and the accelerator pedal position data supplied by the pedal position sensor.

8. The method as claimed in claim 6 of controlling the rotation speed of the heat engine of a load-handling vehicle, wherein the control unit comprising a memory for storing the maximum flow rate of the hydraulic pump, said method comprises:

a step of determination by the control unit, for each actuator controlled in operation by the control system, of a flow rate value of said actuator required to execute the command, when a plurality of actuators are controlled, a step of addition of said required flow rate values of said actuators, a step of comparison of the required flow rate value of the one controlled actuator or of the result of the addition of the required flow rate values of the plurality of controlled actuators with the maximum flow rate of the hydraulic pump, the hydraulic pump flow rate setpoint value corresponding to the smallest value of said comparison.

9. The method as claimed in claim 8 of controlling the rotation speed of the heat engine of a load-handling vehicle, wherein the control system comprising for each actuator that can be controlled by said control system at least one control member that can be actuated manually mounted to be mobile between a neutral position and at least one end of travel position and at least one associated position sensor, said method comprises a step of determination by the control unit of the flow rate value of the or each actuator required to execute the command at least as a function of the data supplied by the at least one position sensor associated with the control member of said actuator.

10. The method as claimed in claim 9 of controlling the rotation speed of the heat engine of a load-handling vehicle, wherein each fluidic circuit connecting an actuator to the hydraulic pump being provided with at least one blocking member mounted to be mobile between an open position and a closed position of said associated circuit and the control unit comprising a memory for storing the maximum flow rate of each blocking member, said method comprises:

a step of determination by the control unit of the flow rate value of each actuator required to execute the command at least as a function of the data supplied by said at least one position sensor associated with the control member of said actuator and the stored maximum flow rate data of the blocking member, and a step of controlling the movement of the blocking member at least as a function of the required flow rate value so determined.

* * * * *